No. 736,884. PATENTED AUG. 18, 1903.
H. SHOEMAKER & H. C. SNOOK.
ART OF ELECTRICAL SIGNALING.
APPLICATION FILED APR. 8, 1903.
NO MODEL.
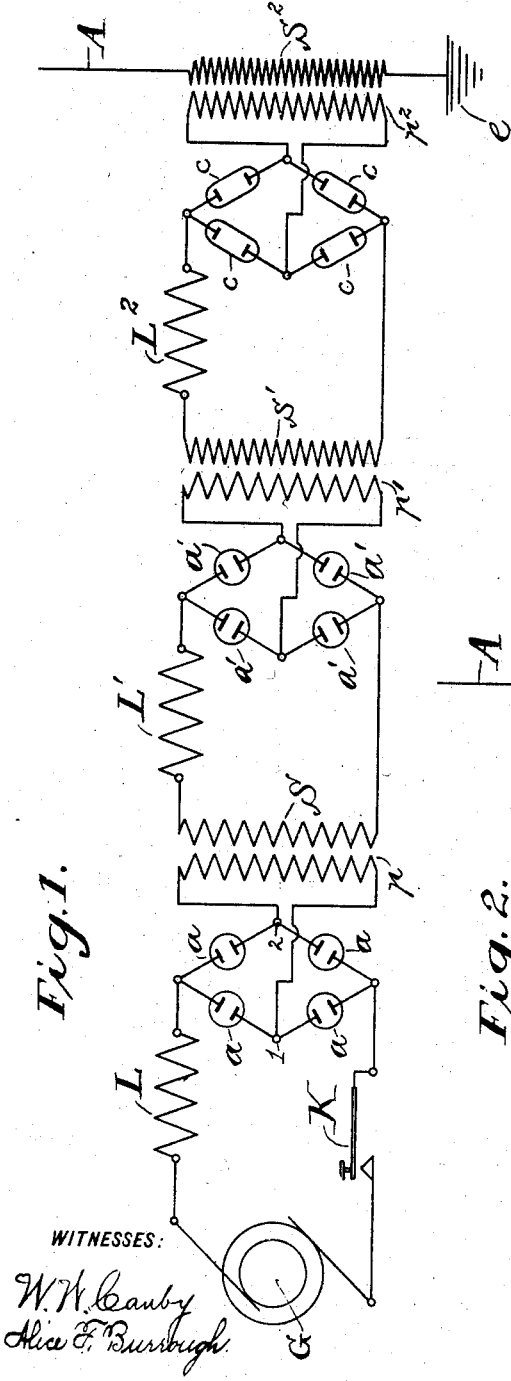
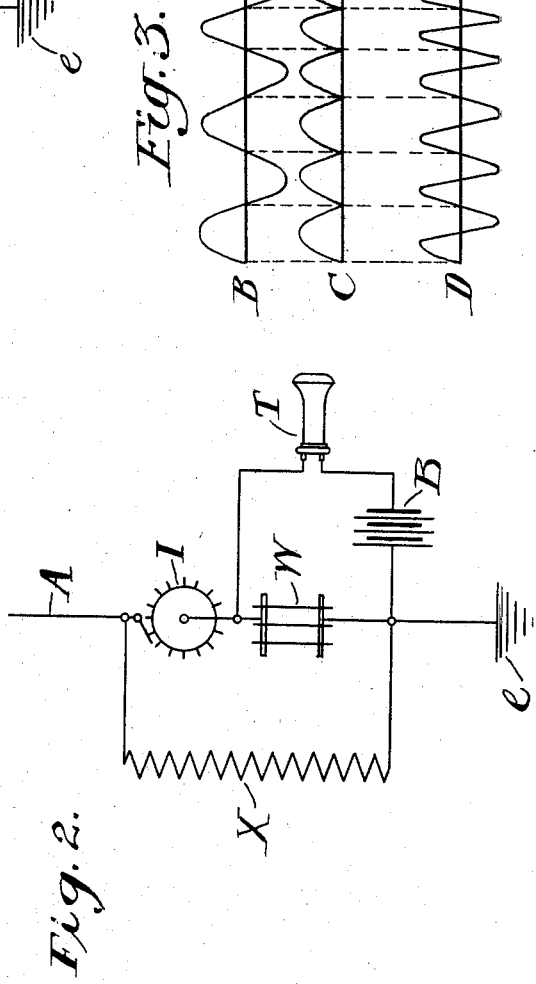
WITNESSES:
W. W. Canby
Alice F. Burrough
INVENTORS
Harry Shoemaker
and
H. Clyde Snook
by Cornelius L. Ehret
their ATTORNEY.

No. 736,884.

Patented August 18, 1903.

UNITED STATES PATENT OFFICE.

HARRY SHOEMAKER AND HOMER CLYDE SNOOK, OF PHILADELPHIA, PENNSYLVANIA, ASSIGNORS OF ONE-THIRD TO MARIE V. GEHRING, OF PHILADELPHIA, PENNSYLVANIA.

ART OF ELECTRICAL SIGNALING.

SPECIFICATION forming part of Letters Patent No. 736,884, dated August 18, 1903.

Application filed April 8, 1903. Serial No. 151,585. (No model.)

*To all whom it may concern:*

Be it known that we, HARRY SHOEMAKER and HOMER CLYDE SNOOK, citizens of the United States, residing at Philadelphia, State of Pennsylvania, have invented a new and useful Art of Electrical Signaling, of which the following is a specification.

Our invention relates to the method of increasing the frequency of a fluctuating or alternating current by static means, dispensing with commutating apparatus and the like.

Our invention comprises a method of changing the frequency of an alternating or undulatory current by rectifying such currents into unidirectional impulses and producing from each impulse a complete cycle of alternating current, then rectifying such derived alternating current into unidirectional impulses and producing from each impulse a complete cycle of an alternating current, and so on indefinitely until the frequency has been increased to the desired amount.

Our invention consists of a method for increasing the frequency of undulatory or alternating currents and passing such current through an electrolytic rectifying-circuit, passing the resulting unidirectional impulses to the primary of the transformer, deriving from the secondary a complete cycle of alternating current for each unidirectional impulse in the primary, and repeating the process as often as desired.

Our invention comprises a method of increasing the frequency of an undulatory or alternating current to an extent to make the high-frequency energy available for use in a wireless signaling system wherein the energy is transmitted through the natural media in electroradiant form.

Our invention consists also of a method of generating electroradiant energy and employing the same in a wireless signaling system.

Heretofore in wireless signaling systems the electroradiant energy has not been perfectly persistent, but existed rather in wave-trains, each train consisting of a number of waves of decreasing amplitude, the number of waves and rate of decrease of amplitude being dependent upon the nature and constants of the circuits generating the waves. By the herein-described system, however, the radiant energy consists of waves of equal amplitude succeeding each other continuously and not broken up into trains.

Reference is to be had to the accompanying drawings, in which—

Figure 1 is a diagrammatic view of the circuit arrangement for increasing the frequency of an undulatory or alternating current and for impressing the derived high-frequency energy upon the natural media. Fig. 2 is a diagrammatic view of the circuit arrangements at the receiving-station of a wireless signaling system. Fig. 3 is a graphical representation of the process of increasing the frequency in an alternating current.

At G is represented a generator of undulatory or alternating current, and in series with said generator are restraining-inductance L, the electrolytic cells $a$ $a$, and the telegraph-key K. The arrangement of the cells $a$ $a$ comprises the Wheatstone bridge arrangement with a cell in each arm. This is the arrangement well known in the art and results in a unidirectional current flowing in the circuit joined at the points 1 and 2. Supposing the current derived from the generator G is a simple alternating one, the current flowing in the circuit joined at the points 1 and 2 is one composed of unidirectional impulses, because the electrolytic cells $a$ $a$ have such property and are so arranged that current can pass through them only in one direction, and the effect is to rectify the alternating current. This rectified current is then passed through the circuit of the primary $p$ of the transformer, and in the secondary S of such transformer there is induced for each of the unidirectional impulses in the primary $p$ a complete cycle of alternating current, and for the succeeding impulses in the primary $p$ the result in the secondary S is an alternating current whose frequency is just twice that of the generator G. This second alternating current is then passed through the second arrangement of electrolytic cells $a'$ $a'$ through the restraining inductance L'. This second alternating current is then converted in like manner into a current of unidirectional impulses which flows through the primary $p'$ of the transformer whose secondary is represented at $S'$. For each unidirectional impulse in the primary $p'$ there is a complete cycle of alternating current induced in the secondary of $S'$, and we have, therefore, a third alternating current whose frequency is four times that of the current delivered from the generator G.

As further means for rectifying the alternating current we may employ Crookes tubes in the same arrangement as disclosed in connection with the electrolytic cells. These tubes also have the property of permitting the passage of current through them in one direction, but opposing it in the other. We have shown, therefore, the Crookes tubes $c\ c$ in the circuit of the secondary $S'$ and in series with the restraining-inductance $L^2$. The alternating current derived from the secondary $S'$ is then rectified by Crookes tubes $c\ c$, and the resulting unidirectional impulses pass through the primary $p^2$, and there is induced in the secondary $S^2$ an alternating current of which there is a complete cycle for each unidirectional impulse in the primary $p^2$. We have then a fourth alternating current whose frequency is eight times that of the current derived from the generator G. If the frequency of the current derived from the generator G were sufficiently high, the number of transformations shown would be sufficient to insure a high enough frequency in the secondary $S^2$ for employment in wireless signaling, and we have shown, therefore, such secondary joined between the radiating conductor A and the earth-plate $e$. Ordinarily, however, a greater number of transformations than those shown would be necessary; but for the sake of brevity and description in the illustration on the drawings only three transformations have been shown. So long as the transformers are to supply their current to electrolytic-cell arrangements the ratio of transformation need be and preferably is only 1 to 1. However, where Crookes tubes or the like are to be supplied the potential should be stepped up, as indicated by the transformer $p'\ S'$.

Our electrolytic devices comprise an iron plate and a plate of an alloy of zinc and aluminium immersed in ammonium phosphate. It is of course to be understood that other plates along with other chemicals may be used.

By "Crookes tubes" we mean any of the well-known vacuum-tubes or vapor-tubes having a greater resistance for the passage of current in one direction than the other.

So long as the telegraph-key K is held depressed there will be radiated from the aerial conductor A electroradiant-energy waves succeeding each other, as in the case of an ordinary alternating current, and having a uniform amplitude.

The arriving energy is transformed in the aerial conductor A of Fig. 2 into an alternating current of high frequency and in which the amplitude is uniform. This received energy oscillates over the aerial conductor A and the inductance X, connected in series between it and the earth-plate $e$.

W is a wave-responsive device comprising metallic terminals bridged by carbon filaments or carbon terminals bridged by metallic needles subjected to the difference of potential at the inductance of the terminals X, and this difference of potential may be excessive, provided the inductance X be properly chosen with respect to the frequency of the transmitted energy and with relation to the aerial conductor A. The arriving energy causes then a change in resistance of the wave-responsive device W, and there is produced a click of the telephone-receiver T, which is joined in a local circuit along with the source of energy B, such local circuit being controlled by the wave-responsive device W.

Suppose the key K be held down for an interval of time representing a dot. Electroradiant-energy waves of uniform amplitude are radiated from A of Fig. 1 during such interval of time, and at the receiving-station an alternating current persists for the same interval of time, and during such interval of time the wave-responsive device W remains in its condition of changed resistances, so there is produced in T only a single click. To insure numerous clicks succeeding each other to represent a dot, the interrupter I is provided. This then breaks up the alternating current in the receiving-circuit, and the wave-responsive device W is subjected numerous times during the interval corresponding to a dot to the received energy and causes numerous clicks in the telephone-receiver T to represent a dot.

In Fig. 3 the curve represented at B is a graphical representation of the alternating current derived from the generator G or from the secondaries S or $S'$. By means of the rectifiers or electrolytic devices the alternating current is transformed into a current of unidirectional impulses, as represented at C. This curve may also represent the fluctuation of the magnetism in the magnetic circuits of the transformers, and from these unidirectional impulses there is derived in the secondary of the transformer an alternating current (represented at D) which is seen to be of just double the frequency of the current represented at B, the current in the circuit immediately preceding that in which the current D is produced.

What we claim is—

1. The method of increasing the frequency of an alternating current which consists in rectifying said current into a current of unidirectional impulses, passing said unidirectional impulses through a circuit, and producing a complete cycle of alternating currents for each impulse in said circuit in a circuit in inductive relation therewith.

2. The method of increasing the frequency of a current, which consists in rectifying said current into unidirectional impulses, passing said impulses through a circuit, and generating an alternating current in a circuit in inductive relation with said circuit.

3. The method of increasing the frequency of a current, which consists in changing said current into a current of unidirectional impulses, passing said impulses through the primary of a transformer, passing the current of increased frequency derived from the secondary of such transformer through rectifying means changing said derived alternating current into a current of unidirectional impulses, passing said impulses through the primary of the transformer, deriving an alternating current of increased frequency in the secondary of such transformer, and so on, repeating the process until the desired frequency is obtained.

4. The method of transmitting intelligence, which consists in generating a variable current, rectifying said current into unidirectional impulses, deriving a current of increased frequency from said unidirectional impulses, progressively increasing the frequency of the energy by the method aforementioned, impressing the energy of high frequency upon the natural media, and subjecting a wave-responsive device at the receiver to the effects of the received energy.

5. The method of transmitting intelligence, which consists in generating an alternating current, rectifying such current into unidirectional impulses, passing said impulses through the primary of a transformer, deriving a current of increased frequency from the secondary of such transformer, repeating the aforementioned process until sufficiently high frequency is obtained, impressing the high-frequency energy upon the natural media, and subjecting a wave-responsive device at the receiver to the effects of the received energy.

6. The method of transmitting intelligence, which consists in generating an alternating current, changing said current into one of unidirectional impulses, passing said unidirectional impulses through a circuit, producing a complete cycle of alternating current from each impulse in said circuit in inductive relation therewith, repeating the aforementioned process until sufficiently high frequency is obtained, impressing the high-frequency energy upon the natural media, and subjecting a wave-responsive device at the receiver to the effects of the transmitted energy.

7. The method of generating continuous electroradiant energy of uniform intensity, which consists in generating an alternating current, transforming said current into one of unidirectional impulses, passing said unidirectional impulses through a circuit, transforming the energy of said unidirectional impulses into the energy of an alternating current in a circuit in inductive relation with said circuit, repeating the aforementioned process until a desired high frequency is attained, and impressing the energy of the high-frequency current upon the natural media.

8. The method of transmitting intelligence, which consists in generating continuous electroradiant energy of uniform intensity, by generating a fluctuating current, transforming said current into one of unidirectional impulses, passing said unidirectional impulses through a circuit, transforming the energy of said unidirectional impulses into the energy of an alternating current in a circuit in inductive relation with said circuit, repeating the aforementioned process until a desired high frequency is obtained, controlling said energy by and in accordance with the signal to be sent, and subjecting a wave-responsive device at the receiver to the effects of the received energy.

HARRY SHOEMAKER.
H. CLYDE SNOOK.

Witnesses:
ALICE T. BURROUGH,
MAE HOFMANN.